Oct. 19, 1948.  E. J. VAGIM  2,451,891
CONTROL CIRCUIT FOR AUTOMATIC WEIGHING MACHINES
Filed March 28, 1945  2 Sheets-Sheet 1

INVENTOR.
E. J. Vagim
BY
Corbett & Webster
ATTYS

Oct. 19, 1948.                    E. J. VAGIM                    2,451,891
                CONTROL CIRCUIT FOR AUTOMATIC WEIGHING MACHINES
Filed March 28, 1945                                        2 Sheets-Sheet 2

INVENTOR.
E. J. Vagim
BY
ATTYS

Patented Oct. 19, 1948

2,451,891

UNITED STATES PATENT OFFICE 2,451,891

CONTROL CIRCUIT FOR AUTOMATIC WEIGHING MACHINES

Edward J. Vagim, Fresno, Calif.

Application March 28, 1945, Serial No. 585,366

3 Claims. (Cl. 249—53)

This invention relates in general to an automatic weighing machine of the type used to weigh bulk material into separate loads or batches of an exact, predetermined weight. In the raisin packing industry, for example, such machines are used extensively.

One object of the present invention is to provide a novel electric control circuit for an automatic weighing machine which includes a plurality of gates actuated by solenoids or the like.

Another object of the instant invention is to arrange the control circuit, as in the preceding paragraph, so that the mechanical parts of the machine, i. e., the gates are actuated by the solenoids in predetermined timed relation. For illustration, the gate for the feed opening of the hopper assembly included in the machine is closed by the circuit prior to opening by said circuit of the outlet gate for the scale bucket or receiver of such machine, whereby there is no excess feeding from said hopper assembly, or undesirable continuing feed after the bucket gate opens.

A further object of the invention is to provide a magnetic control switch of novel construction; such switch being incorporated in the aforesaid control circuit.

A further object of the invention is to provide a simple and inexpensive control circuit for automatic weighing machines, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
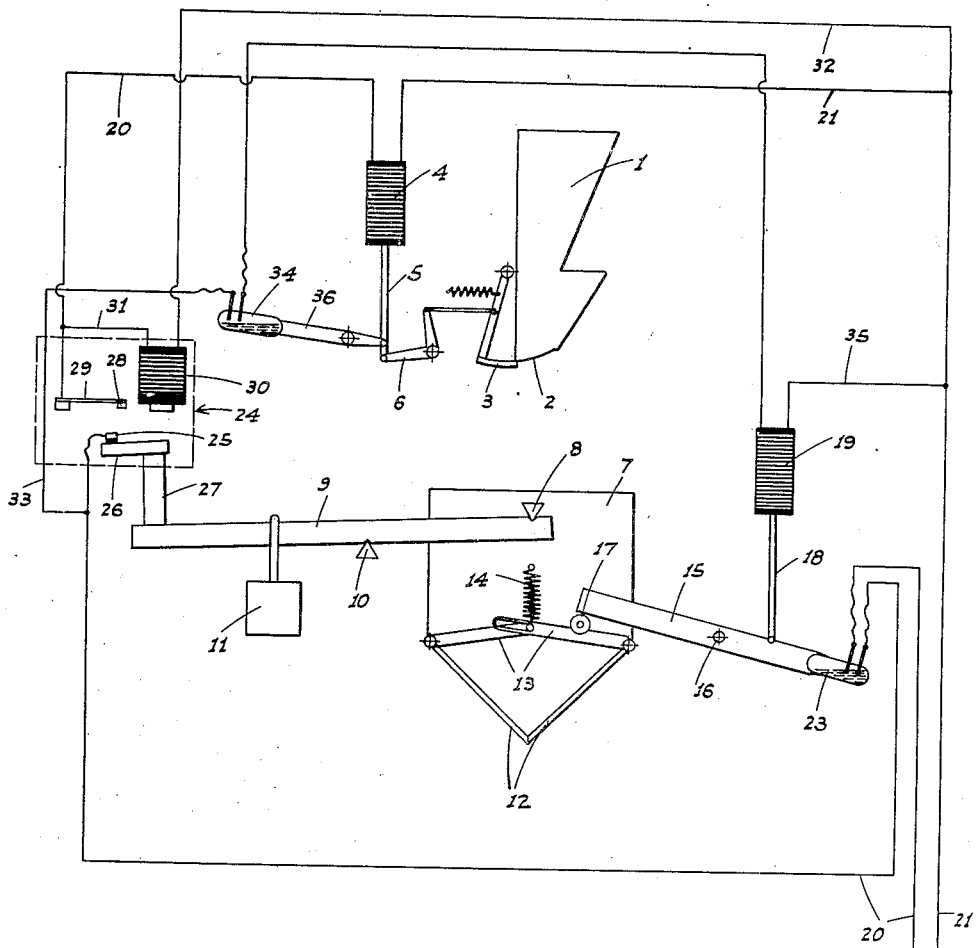
Figure 1 is a diagrammatic view of the circuit showing the position of the parts when the hopper assembly gate is open and the scale bucket is closed.

Referring now more particularly to the characters of reference on the drawings, the control circuit is here embodied in connection with an automatic weighing machine shown, in outline, as including a hopper assembly 1 having a bottom discharge opening 2 with which a pivotally mounted gate 3 is adapted to cooperate. The gate 3 is mounted for swinging movement from the open position of Fig. 1 to the closed position of Fig. 2 and is actuated by means of a solenoid 4. This solenoid includes a solenoid rod 5 connected in operative relation to gate control linkage 6. When the solenoid 4 is deenergized the gate 3 is open, while energization of said solenoid and resultant upward movement of the rod 5 effects closing of said gate. The hopper assembly is here shown as being of the type described in co-pending application for U. S. Letters Patent, Serial No. 585,364 filed March 28, 1945, which matured on July 20, 1948, into Patent Number 2,445,501.

Directly below the hopper assembly 1 the automatic weighing machine includes a scale bucket 7 swingably suspended, as at 8, from a scale beam 9 which rides intermediate its ends on a fulcrum 10. On the side of the fulcrum opposite the scale bucket 7 the scale beam supports an adjustable counterbalance 11.

The scale bucket 7 includes, at the bottom, a dual gate unit 12 comprising gate members adapted to open in opposite directions; said gate members being coupled, for simultaneous movement, by links 13 normally held in upward gate closing position by spring means, indicated at 14. By pressing downwardly on either of the links 13, the gate unit 12 is opened to discharge the load from the scale bucket 7. Such downward movement of one of the links 13 is accomplished through the medium of a lever 15 pivoted intermediate its ends, as at 16; one end portion of said lever carrying a roller 17 adapted to engage said link 13. When the lever 15 is swung in a direction to lower the roller 17, said roller engages and depresses the corresponding link 13, opening the gate unit 12. The lever 15 is connected on the side of the pivot 16 opposite the roller 17, with the actuating rod 18 of a solenoid 19. When the solenoid 19 is deenergized the lever 15 remains in a neutral or inoperative position. However, when said solenoid 19 is energized the rod 18 moves upwardly and swings the roller end of the lever 15 downwardly, tripping the gate unit 12 open.

The control circuit for the gates 3 and 12 of the above generally described automatic weighing machine comprises the following:

A pair of lead wires 20 and 21, comprising a main circuit, lead from a two-wire supply circuit 22; said wires 20 and 21 leading to and being connected with opposite terminals of the solenoid 4. The lead wire 20 has interposed therein, between the supply circuit 22 and the solenoid 4, a normally closed mercury contact switch 23 and a separate, normally open, mechanical contact switch 24; the switches 23 and 24 being connected in series with the switch 23 in the circuit ahead of the switch 24.

The mercury contact switch 23 is mounted on the outer end of the lever 15, with flexible leads running to said switch, whereby to not interfere with swinging movement of said lever. The switch 23 is closed when the rod 18 is advanced, i. e. when the solenoid 19 is deenergized, and at which time the gate unit 12 of the scale bucket 7 is closed.

The switch 24, which will hereinafter be described in somewhat greater detail, includes a movable contact point 25 mounted, in insulated relation, on an armature bar 26 fixed on the upper end of an upstanding leg 27 on the outer end portion of the scale beam 9. The switch 24 also includes a cooperating contact point 28 carried by a spring finger 29; said spring finger 29 being mounted so that the contact point 25 engages the contact point 28 in the switch 24 only after predetermined lowering of the scale bucket 7 under the influence of a load therein, which load is fed into the scale bucket from the hopper assembly 1.

The switch 24 includes an electro-holding magnet 30 positioned in the switch so that when the scale bucket 7 lowers to a predetermined extent, with resultant elevation of the armature bar 26, the latter enters the field of magnet 30 for the purpose as will hereinafter appear.

The magnet 30 is wired in parallel to the solenoid 4 by a holding circuit which includes a wire 31 leading to wire 20 between the switch 24 and said solenoid 4, and another wire 32 which leads to connection with the wire 21.

The solenoid 19 is connected in parallel to the solenoid 4 by a secondary circuit which includes a wire 33 leading from wire 20 ahead of switch 24 to one terminal of said solenoid 19; there being a mercury contact switch 34 interposed in wire 33. The other side of said secondary circuit includes a wire 35 connected between the other terminal of solenoid 19 and wire 21 between solenoid 4 and the supply circuit 22. The mercury contact switch 34 is mounted on the outer end of a pivotally supported lever 36 secured in operative relation to the solenoid rod 5 of solenoid 4. The switch 34 is connected in wire 33 by flexible leads, and said switch is open when the rod 5 is advanced, i. e. when the solenoid 4 is deenergized.

Figure 3:
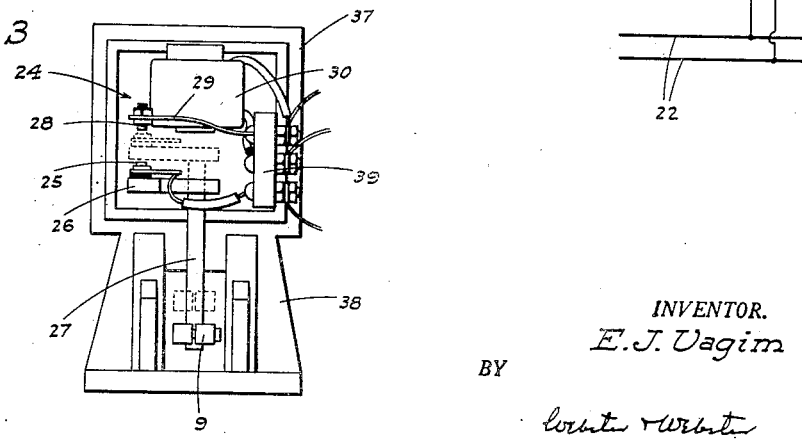
Figure 3 is an end view of the magnetic control switch with the contacts in the position shown in Fig. 1.
Figure 4:
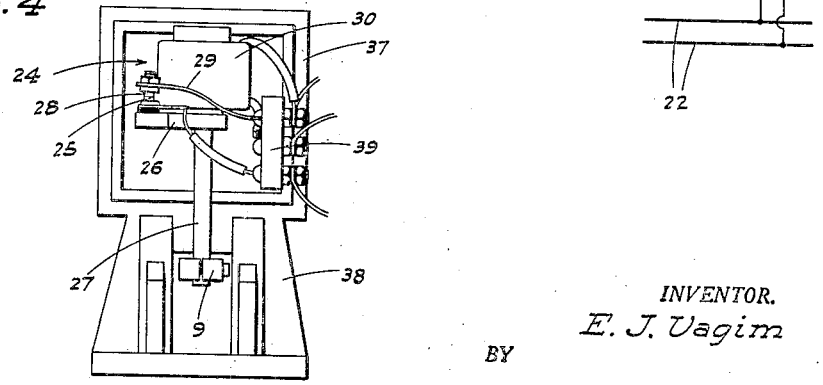
Figure 4 is an end view of the magnetic control switch with the contacts in the position shown in Fig. 2.

The switch 24, which is of special construction, is shown in detail in Figs. 3 and 4 and comprises the following:

An electro-magnet 30 is suspended in a rigid open frame 37 supported by spaced legs 38. The spring finger 29 which carries the contact 28 is mounted in connection with and projects from a dielectric terminal block 39; the armature bar 26 being vertically movably disposed directly below and projecting laterally out relative to the magnet 30. The contact point 25 is carried on the armature bar 26 for engagement of said contact point 25 with contact point 28 upon upward movement of the bar 26, the latter being disposed within the frame 37; and the outer end portion of the scale beam, together with the upstanding leg 27 which supports said armature bar, being vertically movably disposed between the legs 38, as shown. The spring finger 29 carries the contact point 28 so that the latter is engaged by the contact point 25 shortly before the armature bar 26 reaches its upper limit of movement, and at which upper limit of movement said bar is adapted to be held by the magnet 30, when the latter is energized.

In operation of the above described control circuit, the parts thereof are in the positions shown in Fig. 1 when the gate 3 is open and material is feeding from the discharge opening 2 from the hopper assembly 1 into the scale bucket 7. When the load in the scale bucket begins to approach a predetermined weight, said scale bucket begins to lower, with resultant upward movement of the armature bar 26 and contact point 25. Thereafter, as said load is very close to the predetermined weight, the contact 25 engages the contact 28, completing a circuit through wires 20 and 21, which immediately energizes the solenoid 4 and the parallel connected magnet 30.

When this occurs the solenoid rod 5 snaps upwardly, substantially instantaneously closing the gate 3, and at the same time the magnet 30 is energized. Shortly after the magnet 30 is energized, the armature bar 26 reaches its upper limit of movement, and thereafter, while said magnet remains energized, is held in said position. During the period that the magnet 30 is energized it holds the switch 24 closed, as shown in Fig. 2.

Figure 2:
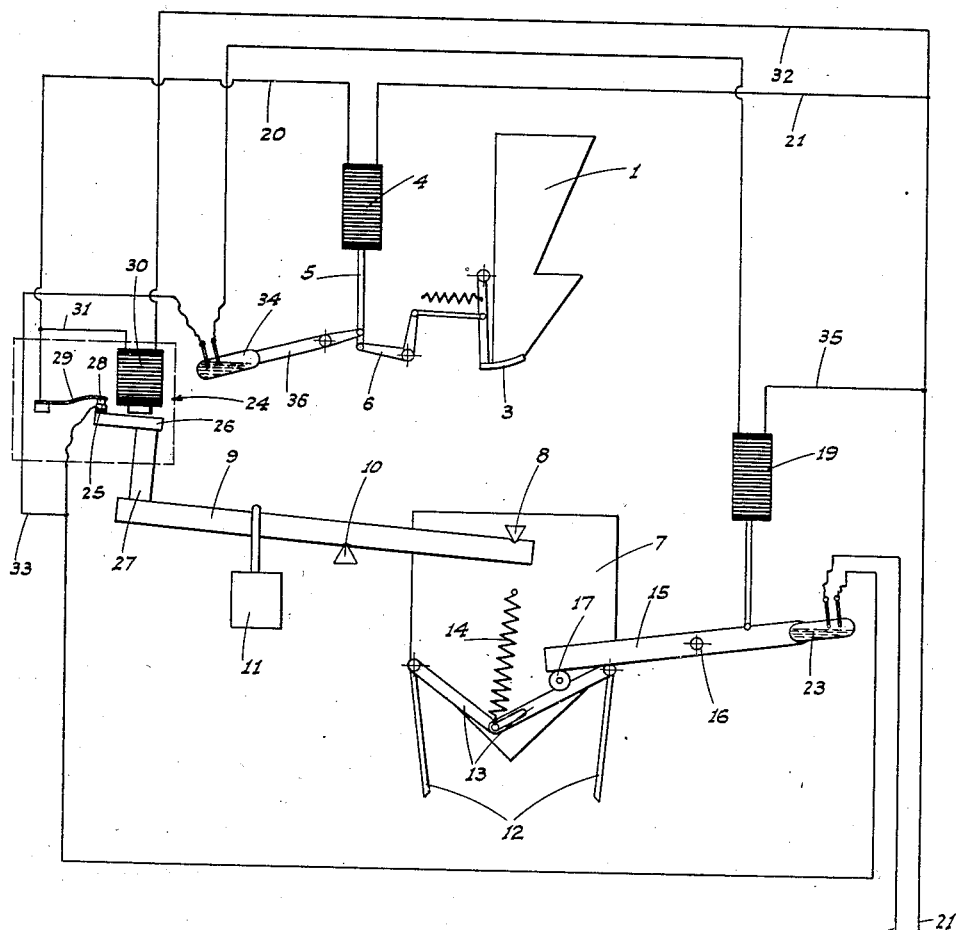
Figure 2 is a similar view, but illustrates the position of the parts when the hopper assembly gate is closed, and the scale bucket gate is open.

Upon closing of the switch 24 with resultant energization of solenoid 4 and resultant closing of the gate 3, the lever 36 is swung in a direction to cause the mercury contact switch 34 to close, as shown in Fig. 2. When this occurs the secondary circuit, comprised of wires 33 and 35, is closed between wires 20 and 21, energizing the solenoid 19, causing the rod 18 to snap upwardly. As this rod snaps upwardly the lever 15 is swung in a direction to open the gate unit 12, and to open the switch 23. Due to the time lag through the circuit, resultant from time required for the several mechanical movements, the gate unit 12 does not open until the last of the material from the hopper assembly 1 reaches the scale bucket 7. In other words, there is a short time lag between closing of gate 3 and opening of gate 12. This is advantageous for the reason that it prevents excess feeding from the hopper assembly 1, or continuing feed therefrom after the bucket gate unit 12 opens.

The moment that the lever 15 swings in a direction to open the gate unit 12, and at which moment the mercury contact switch 23 opens, the circuit comprising wires 20 and 21, together with the holding circuit for the magnet 30 and the secondary circuit for the solenoid 19, are broken; the armature bar 26 immediately falling away from the magnet 30, opening switch 24. With switch 24 open, all of the parts return to the position shown in Fig. 1. The time required for return of the parts to such position is sufficient to permit the load to first discharge from the scale bucket 7, and before closing of the gate unit 12 under the influence of the spring means 14. As the gate unit 12 closes, and the scale bucket 7 returns to its elevated position, the gate 3 on the hopper assembly 1 opens and the feed for the next load begins.

From the foregoing description it will be readily seen that there has been produced such a control circuit for automatic weighing machines as substantially fulfills the objects of the invention as set forth herein.

While this specification sets forth in detail the present and preferred construction of such control circuit, still in practice such deviations from such detail may be resorted to as do not form a departure from the spirit of the invention, as defined by the appended claims.

Having thus described the invention, the following is claimed as new and useful and upon which Letters Patent are desired:

1. An electric control circuit for an automatic weighing machine which includes a hopper assembly having a normally open gate, and a vertically movable scale bucket having a normally closed gate, the hopper assembly being disposed to feed the scale bucket; said control circuit comprising one solenoid operative to close the hopper assembly gate, another solenoid operative to open the scale bucket gate, an energizing circuit in which said solenoids are interposed, means in said circuit responsive to scale bucket lowering to a predetermined position to energize said one solenoid to close the hopper assembly gate, other means in said circuit responsive to closing of the hopper assembly gate to energize said other solenoid to open the scale bucket gate; and a separate switch means disposed in the circuit and which is responsive to opening of the scale bucket gate to break said circuit and deenergize both solenoids whereby the gates return to normal positions.

2. An electric control circuit for an automatic weighing machine which includes a hopper assembly having a normally open gate, one solenoid operative to close the hopper assembly gate, a vertically movable scale bucket into which the hopper assembly feeds, the scale bucket having a normally closed gate, and another solenoid operative to open the scale bucket gate; said control circuit comprising a main energizing circuit in which said one solenoid is interposed, a normally open switch in the main circuit, means actuated by predetermined lowering of the scale bucket operative to close the switch, a secondary energizing circuit connected in parallel in the main circuit, the other solenoid being interposed in the secondary circuit, a normally open switch in the secondary circuit, means actuated by said one solenoid operative to close the switch in the secondary circuit, a separate, normally closed switch in the main circuit ahead of the normally open switch therein, and means actuated by said other solenoid operative to open said normally closed switch in the main circuit.

3. An electric control circuit for an automatic weighing machine which includes a hopper assembly having a normally open gate, one solenoid operative to close the hopper assembly gate, a vertically movable scale bucket into which the hopper assembly feeds, the scale bucket having a normally closed gate, and another solenoid operative to open the scale bucket gate; said control circuit comprising a main energizing circuit in which said one solenoid is interposed, a normally open switch in the main circuit, means actuated by predetermined lowering of the scale bucket operative to close the switch, a secondary energizing circuit connected in parallel in the main circuit, a normally open switch in the secondary circuit, means actuated by said one solenoid operative to close the switch in the secondary circuit, a separate, normally closed switch in the main circuit ahead of the normally open switch therein, and means actuated by said other solenoid operative to open said normally closed switch in the main circuit; an electro-magnet arranged to function, when energized, to hold said normally open switch in the main circuit in closed position upon closing of said normally open switch, and a holding circuit in which the magnet is interposed, said holding circuit being wired into the main circuit in parallel to said one solenoid and beyond said normally open switch in the main circuit.

EDWARD J. VAGIM.

REFERENCES CITED

The following references are of record in the file of this patent:

UNITED STATES PATENTS

| Number | Name | Date |
|---|---|---|
| Re.11,503 | C. F. Wood | July 9, 1895 |
| 1,066,656 | Richardson | July 8, 1913 |
| 1,846,148 | Rumpf | Feb. 23, 1932 |
| 2,177,997 | Ripley | Oct. 31, 1939 |
| 2,314,654 | Merrifield | Mar. 23, 1943 |
| 2,372,746 | Stock | Apr. 5, 1945 |